(No Model.)
W. OLDHAM.
FILTERING APPARATUS.
No. 330,145. Patented Nov. 10, 1885.
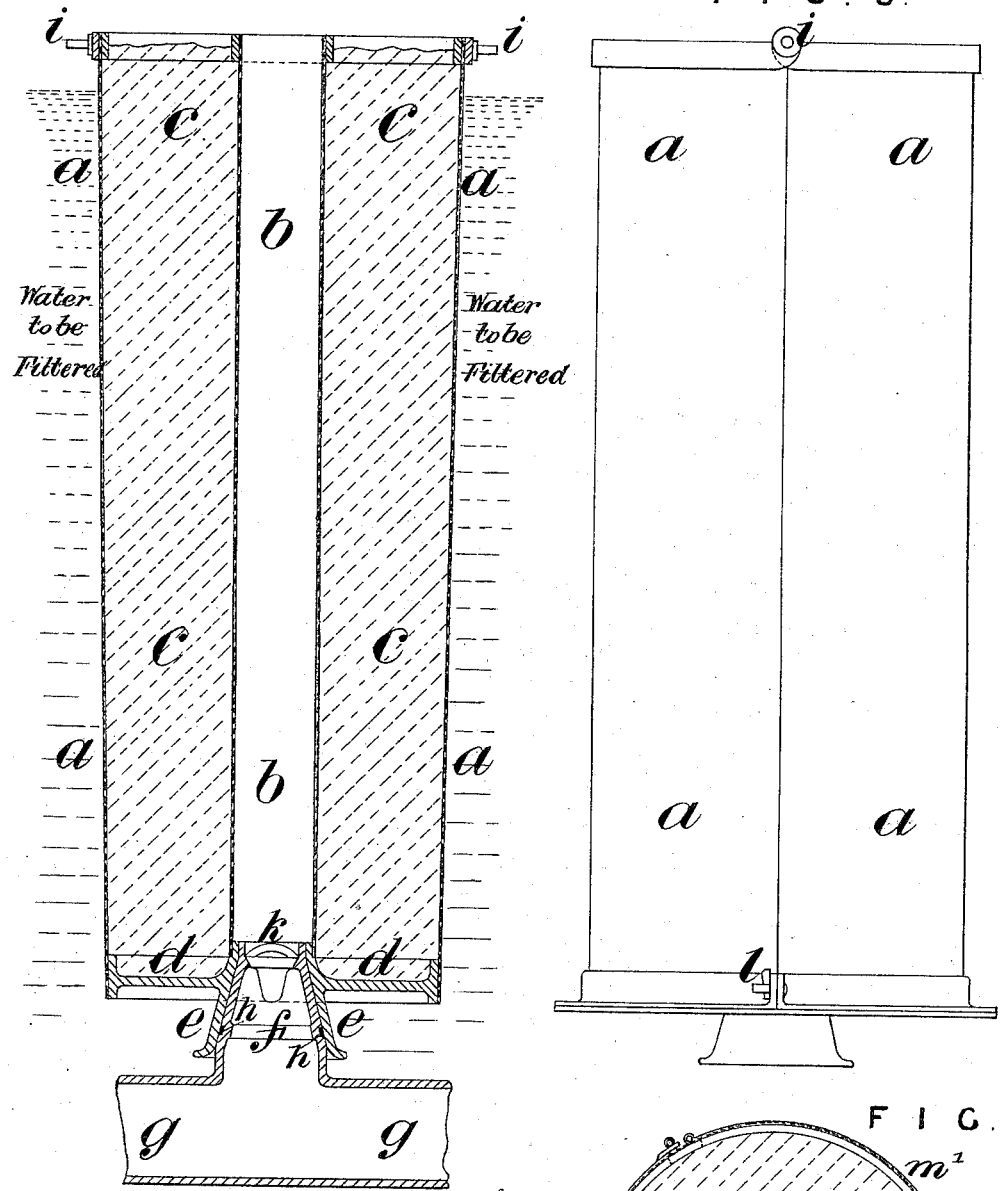
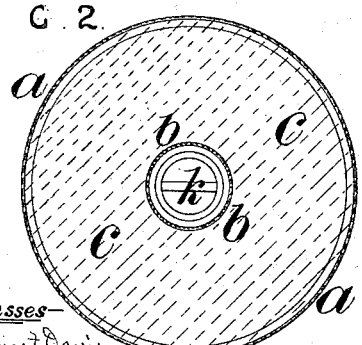
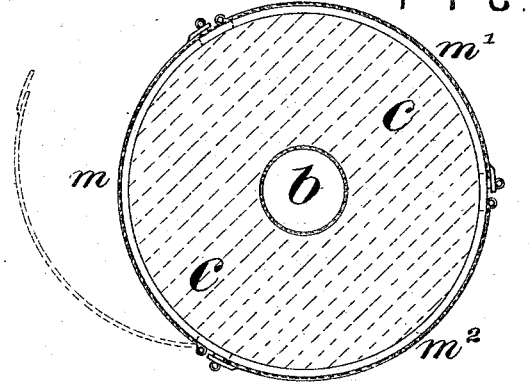

UNITED STATES PATENT OFFICE.

WALTER OLDHAM, OF MANCHESTER, COUNTY OF LANCASTER, ENGLAND.

FILTERING APPARATUS.

SPECIFICATION forming part of Letters Patent No. 330,145, dated November 10, 1885.

Application filed December 26, 1884. Serial No. 151,164. (No model.) Patented in England December 12, 1884, No. 16,326.

*To all whom it may concern:*

Be it known that I, WALTER OLDHAM, a subject of the Queen of Great Britain and Ireland, and residing at Manchester, county of Lancaster, England, have invented certain Improvements in Filtering Apparatus, (for which I have obtained British Patent No. 16,326, dated December 12, 1884,) of which the following is a specification.

My improved apparatus is designed, principally, for use in the filtering of water, and is particularly adapted to cases wherein large quantities of filtered water are required—as, for example, for use in manufactories or for the supply of towns—or to cases wherein large quantities of liquid have to be dealt with—as, for example, in the treatment of sewage. The filtering medium is contained within the space between an outer case or shell and an inner tube or chamber, both being pervious, so that the fluid passes from the outside through the filtering medium into the inner tube and descends therein. The lower end of the filter is formed with a conical socket, which fits on a conical plug, which is fixed on the bottom of the cistern, or is fixed to or formed on a pipe, which conveys away the filtered water or the effluent fluid. Any required number of these filters or units of filtering apparatus may be combined together. When it is desirable to renew or to cleanse the filtering medium, the mouth of the conical plug is closed by means of a valve or stopper, and the filter is lifted out of the cistern, tank, or reservoir and conveyed away to be emptied and recharged.

In the accompany drawings, Figure 1 represents a vertical section of the filter or of a unit in a filtering system. Fig. 2 is a cross-section of the same. Figs. 3 and 4 illustrate methods of construction to facilitate the removal of the filtering medium.

In Figs. 1 and 2, $a$ is the outer case, which in the example is in the form of a cylinder slightly tapering from end to end, to facilitate the discharge of the filtering medium. Within this case is a tube, $b$. The case and tube are both formed of wire-gauze, or of perforated metal, or of a suitably pervious material, or may consist of an open frame covered with such material. The annular space $c$ between the two parts is filled with filtering medium, which may vary according to the use for which the filter is intended. For some purposes sawdust is suitable, and for others carbonized sawdust is preferable, especially when potable water is required.

The case $a$ and the tube $b$ are secured to a bottom plate, $d$, which is formed or provided with a conical socket, $e$. This socket sits upon a hollow plug, $f$, which is formed upon or fixed to a pipe, $g$, which may be connected with any desired number of plugs carrying filters. The pipe $g$ may be laid or sustained within a reservoir and extend through the bank of the same, or be connected with a pump or apparatus to lift or draw off the filtered liquid, say, for example, water. A water-tight joint between the socket and the plug is insured by means of an india-rubber ring, $h$, which is inserted within a groove on the plug, and projects slightly so that the socket bears upon the ring. If not considered to be necessary, this ring may be dispensed with or other elastic packing may be substituted for it.

It is not intended that the case $a$ shall be entirely immersed in the water, but that a short length of the case shall project above the surface. When so arranged, it is not necessary to close the top of the case; but the improved method of mounting the filter may be adopted in cases of filters designed to be totally immersed.

The upper part of the case $a$ is provided with trunnions $i\ i$, whereby the filter can be slung, and be lifted out of the water. Before removing the filter the mouth of the plug $f$ is closed by means of a valve or stopper. In the example a turned seating is formed in the said mouth, and a valve, $k$, fits upon this seating. This valve is designed to be introduced through the pipe $b$ and to be lowered into position by means of a hooked rod or by other suitable means. When the filter is removed, the valve prevents the unfiltered water from passing into the pipe $g$.

When large quantities of filtered water are required, I propose to arrange the filters in rows, and to provide an overhead traveler to command all the filters or units of the filtering apparatus, so that any one can be picked up and be conveyed away to be emptied. By providing spare units a charged unit may be quickly lowered into position to supply the place of the one removed. By thus removing and recharging the units singly the working of the apparatus is not interrupted; or in place of removing the units singly a row or any suitable number of units may be removed at suitable intervals. After the removal and replacement of the filtering-unit the valve $k$ is lifted out and the filtration proceeds. In some of the cases wherein a single filter or two or more units would be mounted in a tank or cistern the plug or plugs $f$ would be bolted or secured to the bottom of the tank. The conical formation of the parts $e$ and $f$ facilitates the replacement of a filter or unit, and to still further facilitate this operation I prefer to bell-mouth the socket. The plug might be upon the filter and the socket upon the plug $f$ or upon the bottom of the tank, but this would not be so good an arrangement as the one shown.

The case $a$ and the pipe $b$ may be square, polygonal, or of suitable forms other than cylindrical, and the valve $k$ may be of any suitable form and material.

The filter shown in Fig. 1 is designed to be emptied by inverting it.

In Fig. 3 the case $a$ is formed in two parts, which are hinged at $i$, and are connected at the bottom on each side by means of cotter-bolts $l$. If the filtering medium is tightly compacted, so as to render the emptying difficult, the bolts $l$ can be knocked out and the case be opened, the two parts moving in opposite directions upon the fulcra at $i$, and leaving the filtering medium easily accessible.

Fig. 4 is a cross-section, and shows the case made with three doors, $m$ $m'$ $m^2$, which are hinged to the frame of the case and open outward in the manner indicated by the dotted lines.

I am aware of Wrigley's British Patent No. 2,699 of 1860, for filtering apparatus, and therefore do not wish to claim anything therein shown; but

I claim as my invention—

1. A filtering apparatus consisting of a number of detachable unit filters, each composed of a tubular filtering medium with a socket at its lower end, a connecting-pipe, through which the filtered liquid is to be conveyed, and valves for closing any one or more of the connections previously to the removal of the unit filter for cleansing or repairs.

2. The combination of a pipe, $g$, having a hollow plug, $f$, with a tubular filter having a socket, $e$, adapted to said plug, and a valve, $k$, adapted to be introduced and withdrawn through the top of the tubular filter, as set forth.

3. The tubular filter consisting of a bottom plate, pervious tubes $a$ and $b$, the former in separable parts, and the intermediate filtering medium, substantially as set forth.

In testimony whereof I have signed my name to this specification in the presence of two subscribing witnesses.

WALTER OLDHAM.

Witnesses:
EDWARD K. DUTTON,
DAVID FULTON.